United States Patent [19]

Machida et al.

[11] Patent Number: 4,907,465
[45] Date of Patent: Mar. 13, 1990

[54] CHANGE SPEED CONTROL STRUCTURE FOR HYDRAULIC TRANSMISSION

[75] Inventors: Satoshi Machida, Sennan; Shigekazu Hasegawa, Sakai; Yoshimi Ota, Osaka; Muneji Okamoto, Sakai, all of Japan

[73] Assignee: Kubota Ltd., Osaku, Japan

[21] Appl. No.: 119,795

[22] Filed: Nov. 12, 1987

[30] Foreign Application Priority Data

Nov. 10, 1986 [JP] Japan ................ 61-267174
Dec. 17, 1986 [JP] Japan ................ 61-302369
Dec. 17, 1986 [JP] Japan ................ 61-302366
Dec. 24, 1986 [JP] Japan ................ 61-310590

[51] Int. Cl.⁴ .............. B60K 17/02; B60K 20/02; B60K 20/12
[52] U.S. Cl. .................... 74/89.2; 74/89.22; 74/473 R; 74/506
[58] Field of Search .............. 74/473 R, 506, 89.2, 74/89.22

[56] References Cited

U.S. PATENT DOCUMENTS

| | | | |
|---|---|---|---|
| 1,935,806 | 11/1933 | Mautsch | 74/89.2 |
| 2,191,543 | 2/1940 | Osborne | 74/473 R |
| 3,088,449 | 5/1963 | Hockaday et al. | 123/179 |
| 3,712,147 | 1/1973 | Bernstein | 74/89.22 |
| 3,800,614 | 3/1974 | Johnson | 74/473 R |
| 4,068,537 | 1/1978 | Wolfe | 74/477 |
| 4,085,833 | 4/1978 | Papasideris | 74/473 R |
| 4,494,418 | 1/1985 | Bellah et al. | 74/475 |
| 4,615,421 | 10/1986 | Lane et al. | 192/3.54 |
| 4,719,812 | 1/1988 | Machida et al. | 74/335 |

FOREIGN PATENT DOCUMENTS

| | | |
|---|---|---|
| 1892499 | 5/1964 | Fed. Rep. of Germany . |
| 2846264 | 11/1979 | Fed. Rep. of Germany .... 74/473 R |
| 55-4974 | 5/1980 | Japan . |
| 61-127949 | 6/1986 | Japan ................ 74/473 R |
| 919570 | 2/1963 | United Kingdom . |

*Primary Examiner*—Leslie A. Braun
*Assistant Examiner*—Scott Anchell
*Attorney, Agent, or Firm*—Gifford, Groh, Sprinkle, Patmore and Anderson

[57] ABSTRACT

A change speed control structure for a hydraulic transmission comprising a rotary valve for controlling a plurality of hydraulic actuators, a shift lever extending through a crooked guide groove, and a relay assembly for transmitting movements of the shift lever to the rotary valve on a reduced scale. The guide groove includes three straight portions extending parallel to one another in series and offset in a transverse direction thereof, each straight portion including a plurality of change speed positions. An adjacent pair of the straight portions are interconnected end to end by a bight portion.

6 Claims, 11 Drawing Sheets

CHANGE SPEED CONTROL STRUCTURE FOR HYDRAULIC TRANSMISSION

BACKGROUND OF THE INVENTION (1) Field of the Invention

The present invention relates to a change speed control structure, particularly for use in an agricultural tractor, for controlling a multispeed transmission by manipulating a shift lever to operate hydraulic actuators.

(2) Description of the Prior Art

A known change speed control structure of this type is disclosed, for example, in U.S. Pat. No. 4,085,833. In this prior structure, a shift lever is guided by a straight guide groove defining a plurality of change speed positions from neutral to top speed arranged in series. This straight guide groove has the advantage of facilitating a change speed operations since the shift lever is movable linearly along the guide groove, namely in one action. However, there is the danger of a sudden starting, acceleration or deceleration resulting from an operation of the shift lever beyond a desired change speed position.

Proposals have been made in U.S. Pat. Nos. 2,917,941 and 4,216,680 to eliminated the above drawback by providing a stepwise guide groove crooked to define respective change speed positions of the shift lever. Such a guide groove does not include a straight section including a plurality of change speed positions, and therefore has the advantage of allowing reliable and safe change speed operations without a chance of the shift lever being switched beyond a desired change speed position. However, it has the disadvantage of very poor operability in that the shift lever must be flexed for movement from one change speed position to another.

Further, the same U.S. Pat. Nos. 4,085,833, 2,917,941 and 4,216,680 disclose link type relay assemblies for transmitting the movements of the shift lever to a hydraulic actuator control valve, and the Japanese utility model application laid open (Kokai) under No. 55-4974 discloses a wire type relay assembly which has a simpler construction and a greater adaptability than the link type.

This wire type relay assembly employs two wires for operatively connecting the shift lever to a change speed rotary valve to allow for a compact and bending interlocking system. The wires are wound on a small valve-side pulley and a large lever-side pulley so that an angle of rotation at the lever side is transmitted as enlarged to the valve side.

The valve-side pulley is rotatable by means of the two wires, in the clockwise direction by one of the wires and in the counterclockwise direction by the other, and therefore has an effective operating angle in the order of 120 degree with respect to the rotary valve. This construction results in the disadvantage that a large number of control ports cannot be provided without enlarging the spool diameter of the rotary valve.

SUMMARY OF THE INVENTION

The object of the present invention is to provide a change speed control structure for a hydraulic transmission which overcomes the above-noted disadvantages and enables a safe and efficient change speed operation.

This object is achieved according to the present invention by a change speed control structure for a hydraulic transmission having change speed hydraulic actuator means, comprising a rotary valve for controlling the change speed hydraulic actuator means, shift lever means including a shift lever body and a guide groove for guiding the shift lever body, the guide groove including a first straight portion, a second straight portion and a third straight portion extending parallel to one another in series and offset in a transverse direction thereof, a first bight portion interconnecting an end of the first straight portion adjacent the second straight portion and an end of the second straight portion adjacent the first straight portion, a second bight portion interconnecting an end of the second straight portion adjacent the third straight portion and an end of the third straight portion adjacent the second straight portion, and an upper end, each of the straight portions including a plurality of change speed positions, and a relay assembly for transmitting movements of the shift lever body to the rotary valve.

Each of the straight portions of the guide groove including a plurality of change speed positions permits a change speed operation to be carried out smoothly over a part of an entire change speed range by moving the shift lever back and forth along each straight portion. Moreover, since a bight portion is provided between adjacent straight portions, it is necessary to flex the shift lever once for switching from one straight portion to another. This prevents the shift lever from moving from one straight portion to another in a single stroke of operation.

Thus, the present invention assures operability of the shift lever and safety by means of a simple change in the guide groove shape. Particularly where the three straight sections define a low speed zone including low speed positions, an intermediate speed zone including intermediate speed positions, and a high speed zone including high speed positions, respectively, the shift lever may be operated along the respective straight portions according to the nature of operation, such as the low speed zone for a plowing operation, the intermediate speed zone for a front loader operation, and the high speed zone for running on the road. This construction provides excellent operability in practical use.

In a preferred embodiment of the invention, the relay assembly includes a first pulley mounted on a rotary shaft operatively connected to the shift lever body, a second pulley mounted on a rotary shaft operatively connected to the rotary valve and having a smaller diameter than the first pulley, a first transmission strip having an end wound on and secured to the first pulley and the other end wound on and secured to the second pulley for transmitting a rotation in one direction of the first pulley to the second pulley, and a second transmission strip having an end wound on and secured to the first pulley and the other end wound on and secured to the second pulley in opposite directional relationship with the first transmission strip for transmitting a rotation in the other direction of the first pulley to the second pulley. The first and second transmission strips have the other ends partially overlapping each other in the winding directions on the second pulley.

This construction provides an increased operating angle of the valve-side pulley with respect to the rotary valve.

Other objects and advantages of the present invention will be apparent from the following description referring to the drawings.

DESCRIPTION OF THE PREFERRED EMBODIMENT

Figure 1:
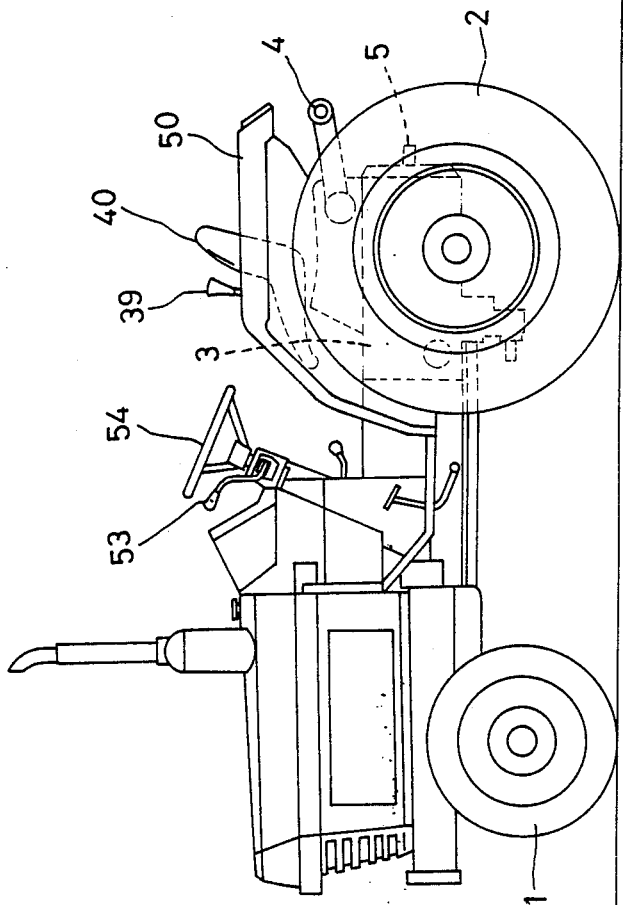
FIG. 1 is a side elevation of an agricultural tractor comprising a change speed control structure for a hydraulic transmission according to the present invention.

As shown in FIG. 1, an agricultural tractor comprises front wheels 1, rear wheels 2, both being drive wheels, and a transmission case 3 constituting a rear part of a chassis. The transmission case 3 carries a lift arm 4 for connection to and raising and lowering a rotary plow or various other working implements, and includes a power takeoff shaft 5 for driving the working implement connected to the tractor.

Figure 2:
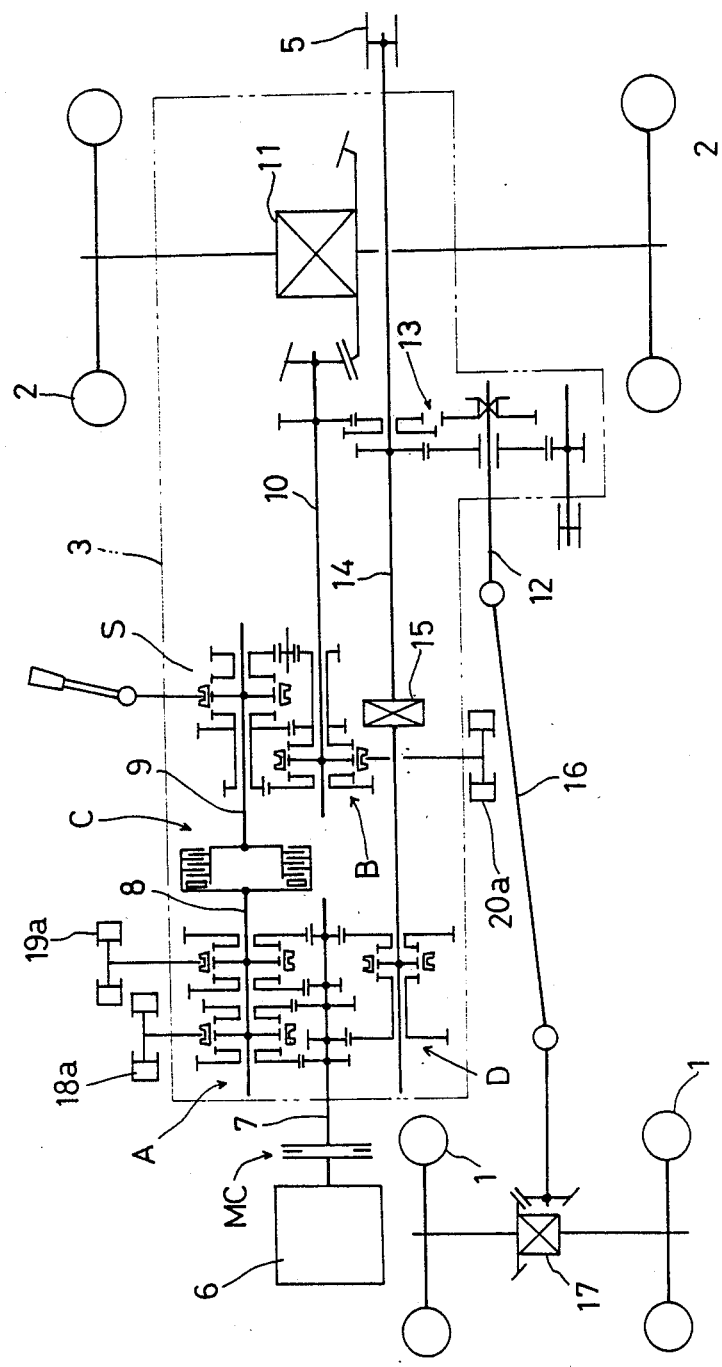
FIG. 2 is a diagram of a transmission system of the tractor shown in FIG. 1.

As shown in FIG. 2, power is transmitted from the engine 6 to the transmission case 3 through a main clutch MC. The transmission case 3 changes the speed of the power received from the engine 6 for driving the front and rear wheels 1, 2 and the power takeoff shaft 5 projecting rearwardly from the transmission case 3.

Figure 3:
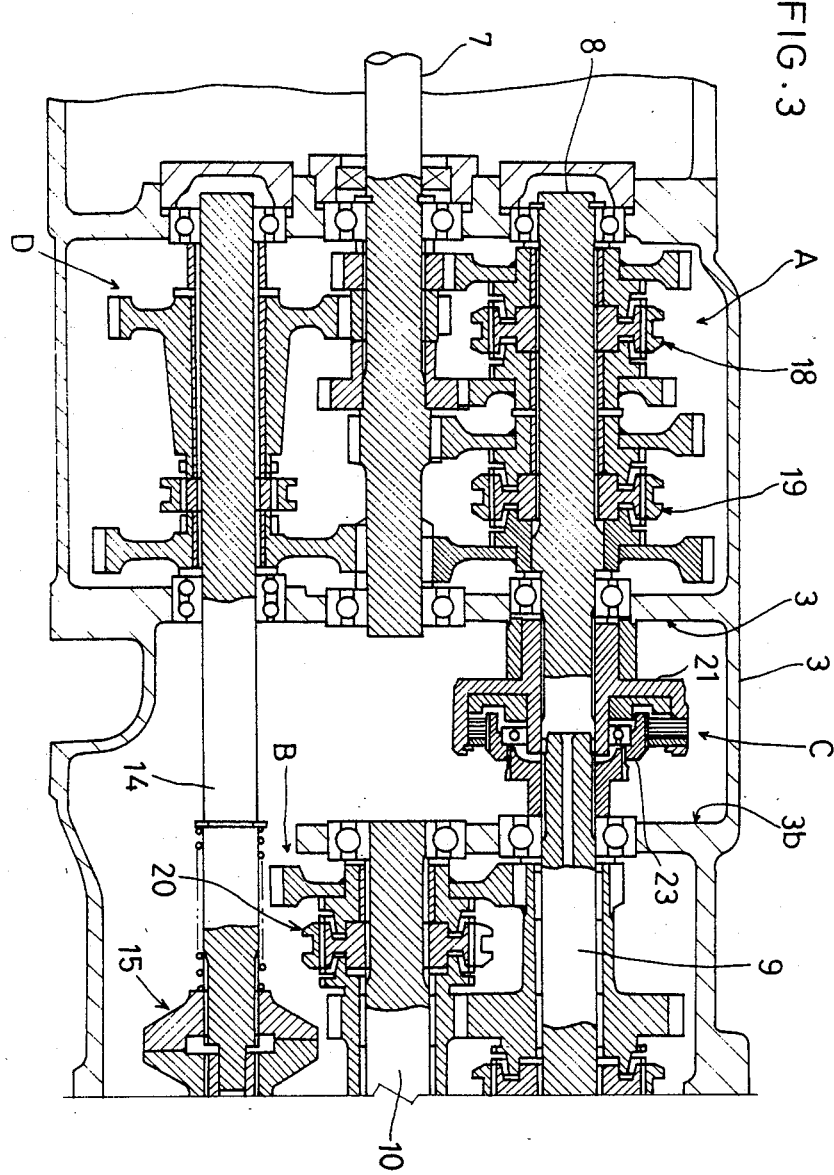
FIG. 3 is a sectional view of a transmission case adjacent an oil clutch.

As also seen from FIG. 3 showing details inside the transmission case 3, the transmission case 3 houses a synchromesh type main change speed device A for receiving the power from a drive shaft 7 and transmitting it in four speeds to a first shaft 8 acting as output shaft, a multidisk oil clutch C disposed between the first shaft 8 and a second shaft 9 acting as input shaft, a synchromesh type auxiliary change speed device B for receiving the power from the second shaft 9 and transmitting it in two speeds to a third shaft 10, a synchromesh type backward and forward changeover device S for receiving the power from the second shaft 9 and reversing it for transmission to the auxiliary change speed device B, a differential 11 for transmitting the power from the third shaft 10 to the rear wheels 2, a transmission gearing 13 for transmitting the power from the third shaft 10 to an output shaft 12 for driving the front wheels 1, and a constant mesh type power takeoff line change speed device D for receiving the power from the input shaft 7 and transmitting it in two speeds to a fourth shaft 14 for driving the power takeoff shaft 5. The fourth shaft 14 includes a unidirectional clutch 15. The power of the output shaft 12 is transmitted to the front wheels 1 through an intermediate shaft 16 and a differential 17. The above construction is able to propel the tractor at eight forward speeds and eight backward speeds.

A speed control system of the agricultural tractor includes hydraulic actuators 18a, 19a and 20a for operating two change speed sleeves 18 and 19 in the main change speed device A and a forward drive change speed sleeve 20 in the auxiliary change speed device B, respectively. A sequence operation type hydraulic system is provided for disengaging the oil clutch C immediately before a change speed operation through these hydraulic actuators 18a, 19a and 20a and engaging the oil clutch C immediately after the change speed operation. This enables the change speed operation to be carried out without disengaging the main clutch MC.

Figure 4:
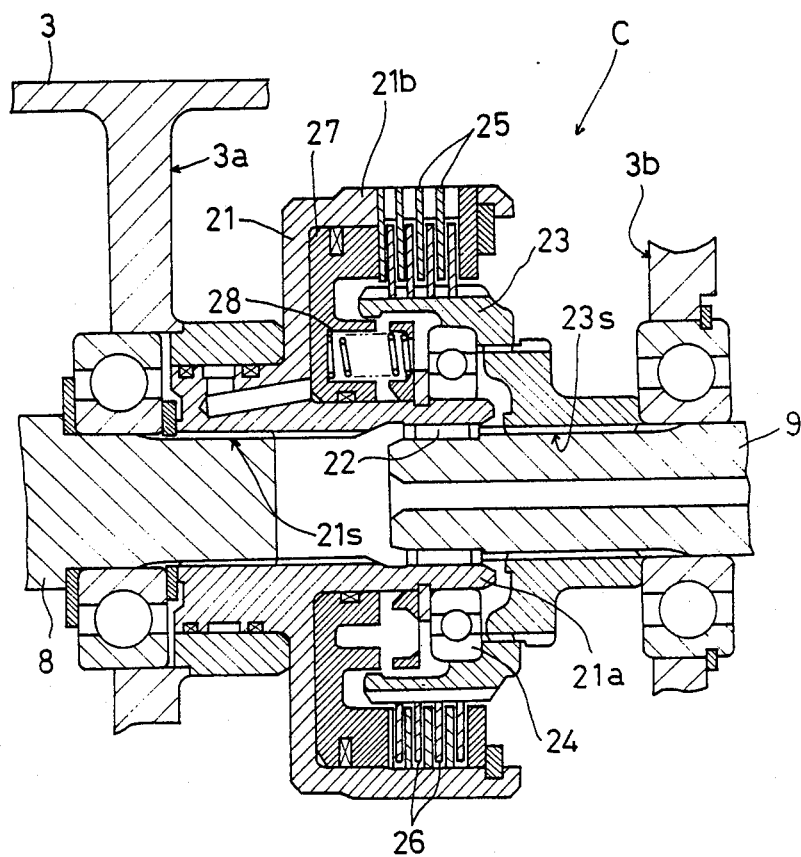
FIG. 4 is a sectional view of the oil clutch.

As shown in FIG. 4, the oil clutch C comprises a clutch case 21 mounted on the first shaft 8 through splines 21s and on the second shaft 9 through a needle bearing 22, a small diameter transmission member 23 mounted on the second shaft 9 through splines 23 and on a tubular inside portion 21a of the clutch case 21 through a ball bearing 24, a plurality of disk plates 25 supported by a large diameter portion 21b of the clutch case 21, a plurality of disk plates 26 supported by the small diameter transmission member 23 and arranged alternately with the disk plates 25, a hydraulic piston 27 for pushing these disk plates 25 and 26 into pressure contact with one another, and a spring 28 having a biasing force in a direction to release the disk plates 25 and 26 from the pressure contact.

The oil clutch C is mounted between a front wall 3a and a rear wall 3b. For assembling the transmission case 3, the oil clutch C is assembled beforehand, and after the first shaft 8 is assembled into the transmission case 3 the oil clutch C is placed on the first shaft 8. In order to enable this assembling operation, the first shaft 8 has a rear end appropriately spaced from the rear wall 3b to receive the oil clutch C.

Figure 5:
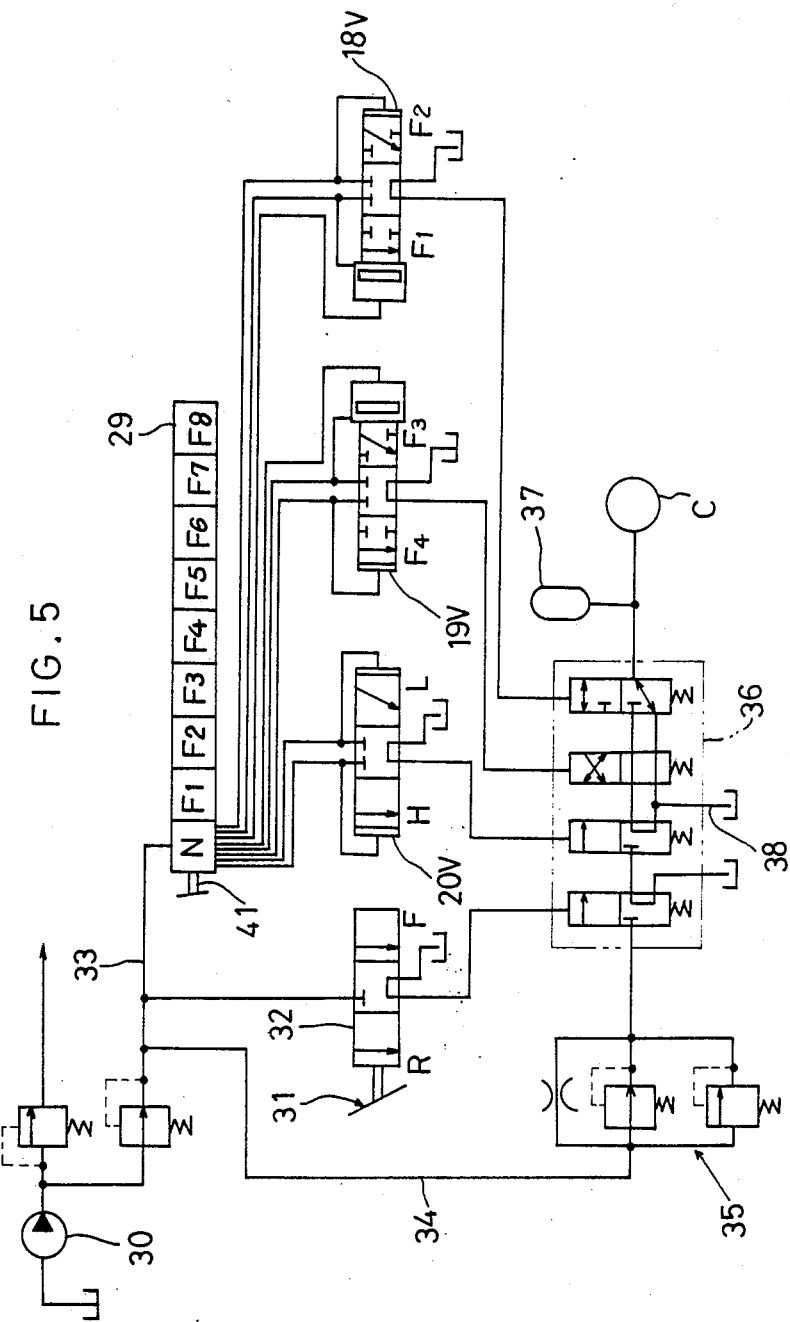
FIG. 5 is a diagram of a hydraulic circuitry for a change speed control system.

FIG. 5 shows a hydraulic circuitry for controlling the main change speed device A, auxiliary change speed device B, backward and forward drive changeover device S, and so forth. Reference 18V indicates a three position switch valve formed integrally with the hydraulic actuator 18a as its control section. Reference 19V indicates a three position switch valve formed integrally with the hydraulic actuator 19b as its control section. Similarly, reference 20V indicates a three position switch valve formed integrally with the hydraulic actuator 19c as its control section.

The three switch valves 18V, 19V and 20V are operable by pressure oil supplied thereto from an oil pump 30 through a change speed rotary valve 29, thereby to control the main change speed device A and auxiliary change speed device B. A pilot pressure is generated when each of the three switch valves 18V, 19V and 20V are operated to a position other than neutral.

The actuator 20a for operating the auxiliary change speed device B is movable to two positions only, namely a low speed position L and a high speed position H. The switch valve 20V of the actuator 20a has a neutral position effective only halfway between the two positions.

The backward and forward drive changeover device S is manually operable by a pivotable control lever 31 through a manual control line including a hydraulic valve 32. That is, the hydraulic valve 32 generates a pilot pressure when the backward and forward drive changeover device S is set to a forward drive position F or a backward drive position R.

The oil clutch C is operable to transmit the power when pressure oil is supplied thereto. The oil clutch C receives the pressure oil through an oil line 34 branched from an oil line 33 between the oil pump 30 and the change speed valve 29.

The oil clutch C is automatically disengaged when one of the main change speed device A, auxiliary change speed device B and oil clutch C is shifted, and is automatically engaged again after the shifting operation is completed. Thus the change speed operation is carried out without disengaging the main clutch MC.

More particularly, the oil line 34 includes a pressure control valve assembly 35, and a group of switch valves 36 operable by the pilot pressure provided by the three three-position switch valves 18V, 19V and 20V, respectively. An accumulator 37 is disposed as branched from the oil line 34.

When the main change speed device A is set to a position to drive the tractor, the group of switch valves 36 are placed in communication with one another and the oil clutch C is maintained in an engaged position. When in this state one of the main change speed device A, auxiliary change speed device B and backward and forward drive changeover device S is operated, the pilot pressure from the switching control system reduces during the switching operation whereby the group of switch valves 36 break the oil supply from the oil pump 30 and simultaneously drains the pressure oil from the oil clutch C through a drain oil line 38 to disengage the oil clutch C. When the change speed operation has been completed, the group of switch valves 39 return to the communicating state thereby to engage the oil clutch C.

Figure 6:
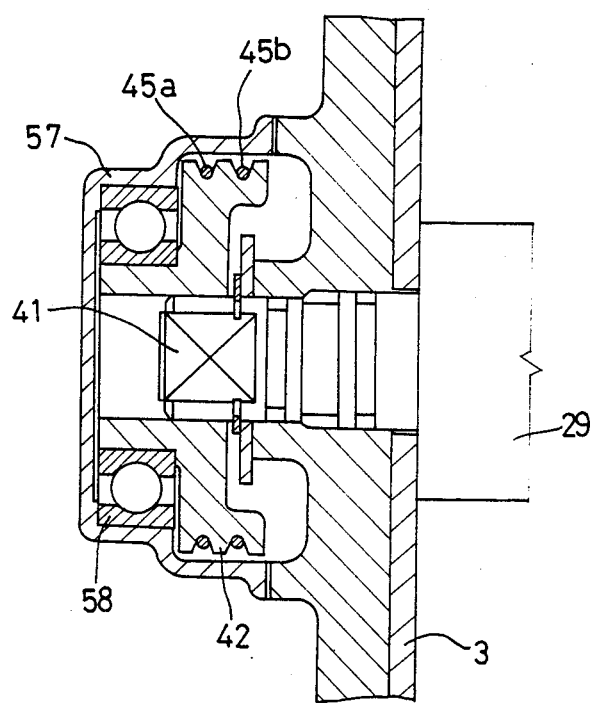
FIG. 6 is a sectional view of a change speed valve mounting structure.

A control structure for the rotary valve 29 will be described next. As shown in FIG. 6, the rotary valve 29 is mounted on the transmission case 3. The rotary valve 29 is controllable by a shift lever 39 disposed laterally of a driver's seat 40 as shown in FIG. 1.

Figure 7:
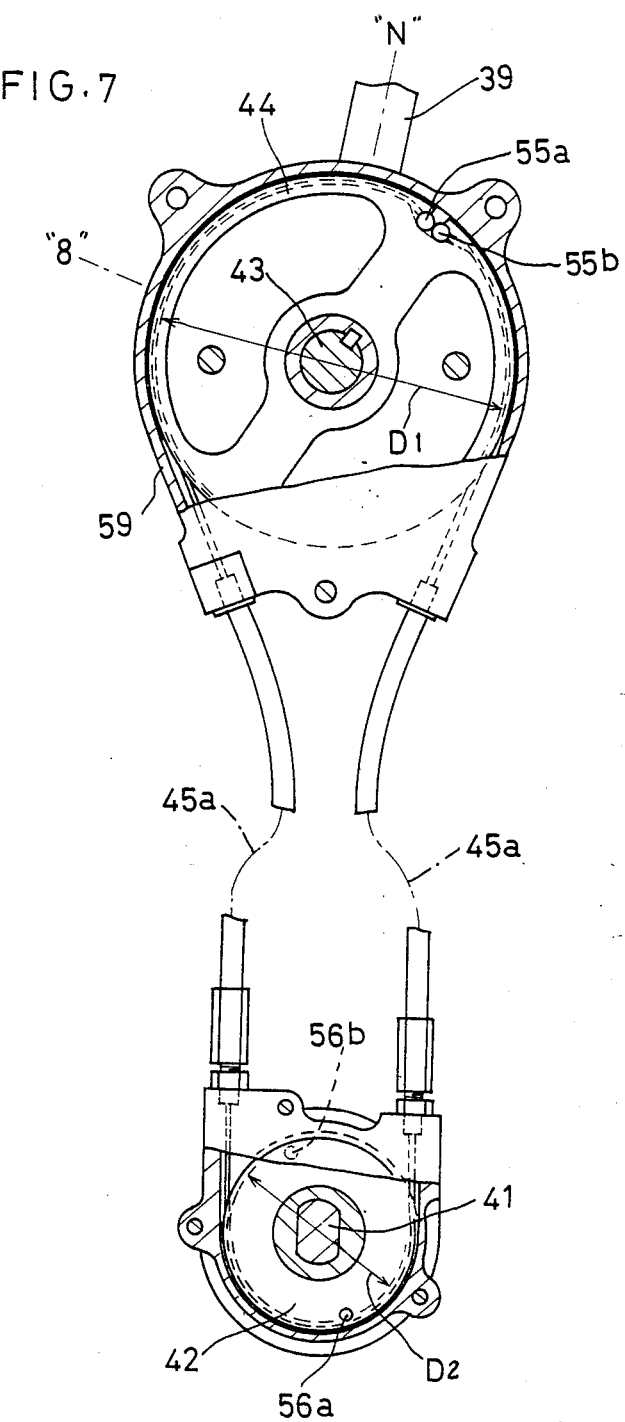
FIG. 7 is a side view of an interlocking mechanism between a shift lever and the change speed valve.

As shown in FIG. 7, a relay assembly for transmitting movements of the shift lever 39 to the rotary valve 29 comprises a valve-side wire pulley 42 mounted for unitary rotation on a rotary shaft 41 acting as a spool of the rotary valve 29, a lever-side wire pulley 44 mounted on unitary rotation on a rotary shaft 43 of the shift lever 39, and a pair of interlocking release wires 45a and 45b each having opposite ends wound on the two pulleys 42 and 44, respectively. One of the release wires 45a and 45b transmits rotations in one direction of the lever-side wire pulley 44 to the valve-side wire pulley 42 and the other transmits rotations in the opposite direction.

Figure 8:
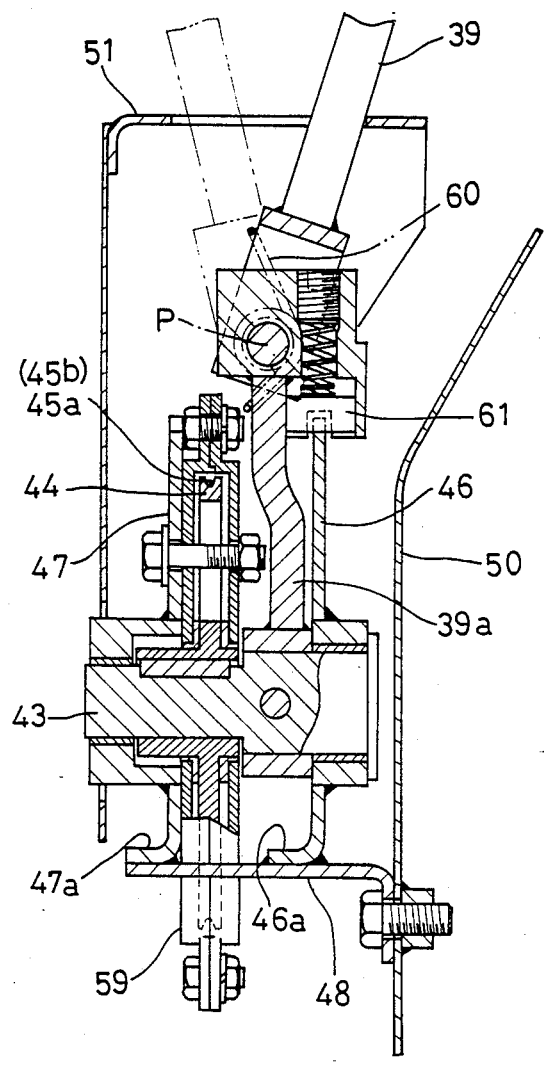
FIG. 8 is a front view, partly broken away, of a shift lever mounting structure.
Figure 9:
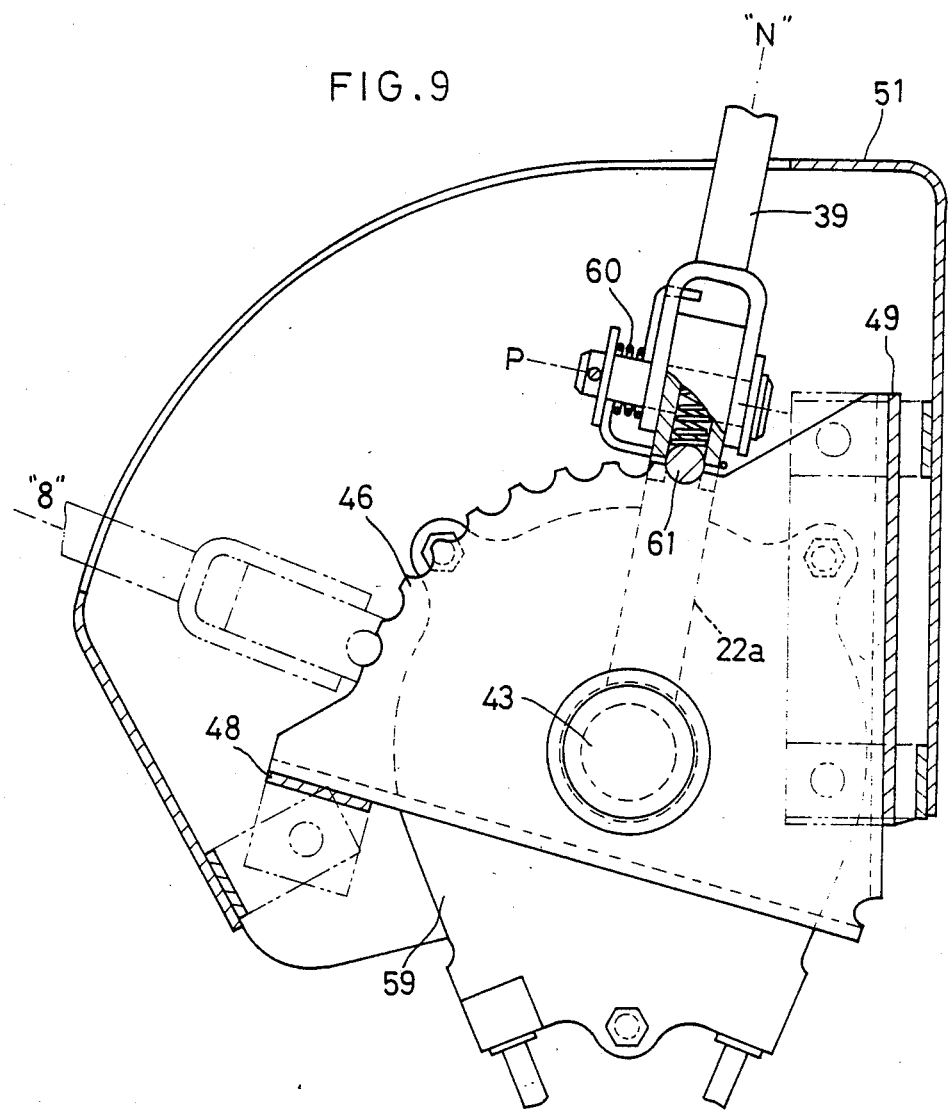
FIG. 9 is a side view of the shift lever mounting structure.

As shown in detail in FIGS. 8 and 9, the shift lever 39 is attached to a rear wheel fender 50 through the rotary shaft 43, a pair of support plates 46 and 47, and two mounting stays which act also as members interconnecting the support plates 46 and 47.

Figure 10:
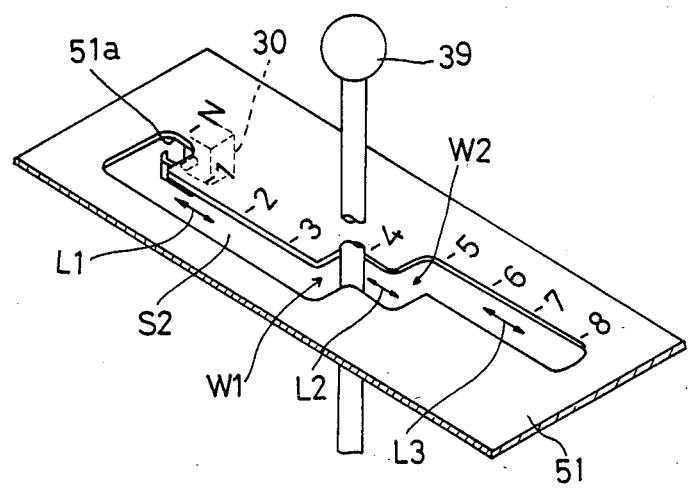
FIG. 10 is a perspective view of a guide groove and the shift lever.

The shift lever 39 is flexible on an axis P extending perpendicular to the axis of rotary shaft 43 to be pivotable along a crooked guide groove 52 defined in a lever guide plate 51 as shown in FIG. 10. The shift lever 39 is pivotable longitudinally of the tractor on the axis of rotary shaft 43 to a first control position "N" to provide neutral, a second control position "1" to provide a first speed, a third control position "2" to provide a second speed, a fourth control position "3" to provide a third speed, a fifth control position "4" to provide a fourth speed, a sixth control position "5" to provide a fifth speed, a seventh control position "6" to provide a sixth speed, and an eighth control position "7" to provide a seventh speed, and a ninth control position "8" to provide an eighth speed.

As seen from FIG. 1, the backward and forward changeover lever 53 operatively connected to the switch valve 32 of backward and forward drive changeover device S is disposed adjacent a steering wheel 54 to be pivotable longitudinally of the tractor.

As clearly shown in FIG. 7, the lever-side wire pulley 44 is formed to have a larger wire winding diameter D1 than a wire winding diameter D2 of the valve-side wire pulley 42. Because of the difference in diameter, an operating angle of the shift lever 39 is transmitted as enlarged to the change speed valve 29.

Each of the release wires 45a and 45b has the lever-side end attached to the lever-side wire pulley 44 by a connecting pin 55a or 55b and the valve-side end attached to the valve-side wire pulley 42 by a connecting pin 56a or 56b. This construction prevents a slip from occurring in the operating force transmission by the pair of release wires 45a and 45b.

As shown in FIGS. 6 and 7, the valve-side wire pulley 42 comprises a two-score pulley on which part of one of the release wires 45a overlaps part of the other release wire 45b as seen axially of the valve-side wire pulley 42. Thus, although the valve-side wire pulley 42 has a small diameter, this construction secures a necessary length of each of the release wires 45a and 45b wound on the valve-side wire pulley 42 for switching the change speed valve 29.

The valve-side wire pulley 42 is supported by the rotary shaft 41 and a pulley case 57 attached to the transmission case 3. Adaptability is provided between the pulley case 47 and the bearing 58 for accommodating an axial displacement between the case 57 and the rotary shaft 41 due to an assembly error and a manufacturing error and a deviation of the rotary shaft 41 relative to the valve case. This allows the wire pulley 42 to rotate smoothly in spite of such displacement and deviation.

As shown in FIGS. 7 to 9, the lever-side wire pulley 44 is mounted in an aluminum alloy case 7. The shift lever 39 is biased by a spring 60 to a flexed position so that a grip portion of the lever 39 is in sliding contact with a portion of the lever guide 51 adjacent the rear wheel fender and engages with a lever locking portion 51a of the lever guide 51a. A detent roller 61 is provided to set the shift lever 39 to the first to ninth control positions by selectively engaging a plurality of recesses defined in one of the support plates 46.

In FIG. 8, reference 39a indicates a boss portion of the shift lever 39 connected to the rotary shaft 43, reference 46a indicates a flange of the support plate 46, and reference 47a indicates a flange of the support plate 47. The two flanges 46a and 47a are fixed to the stay 48.

As shown in FIG. 10, the guide groove 52 for guiding the shift lever 39 includes three straight sections L1, L2 and L3 parallel to one another. The straight sections L1, L2 and L3 are displaced successively in the longitudinal direction to have adjacent ends interconnected by bight sections W1 and W1 formed continuous with and at right angles to the straight sections L1, L2 and L3. The guide groove 52 further includes the neutral section "N" formed at an end thereof to extend in the same direction as the bend sections W1 and W2. The three straight sections L1, L2 and L3 extending from the neutral section "N" define a low speed zone, an intermediate speed zone and a high speed zone, respectively. The low speed zone includes low speed positions for the first to third speeds, the intermediate speed zone includes intermediate speed positions for the fourth to fifth speeds, and the high speed zone includes high speed positions for the sixth to eighth speeds, as described hereinbefore.

The first to ninth control positions "N" and "1" to "8" of the shift lever 39 and positions of the three-position switch valves 18V, 19V and 20V have relations as shown in the following table, for example:

| Lever positions | Switch valve positions (FIG. 5) | | | | | |
|---|---|---|---|---|---|---|
| | 18V | | 19V | | 20V | |
| | left | right | left | right | left | right |
| "1" | | | | | | |
| "2" | | | | | | |
| "3" | | | | | | |
| "4" | | | | | | |
| "5" | | | | | | |
| "6" | | | | | | |
| "7" | | | | | | |
| "8" | | | | | | |

As will be understood from this table, all of the three switch valves must be switched only when the shift lever is moved between the control positions "4" and "5", which results in a slightly long response time in the change speed operation between these positions. However, as seen from FIG. 10, the shift lever must be operated by a two-step operation between the control positions "4" and "5" although the lever is shiftable linearly between the control positions "1" and "4" and between the control positions "5" and "8". Thus, the guide groove is matched with the operational sequence of the switch valves.

Figure 11:
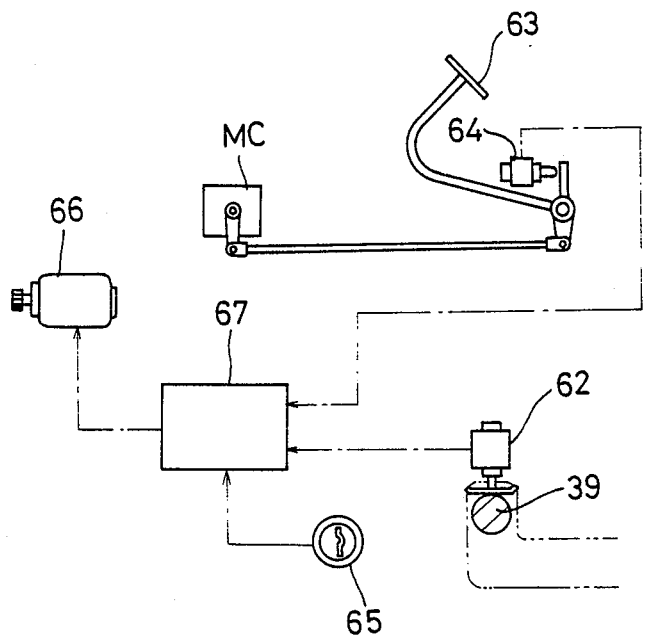
FIG. 11 is a schematic view showing an operative connection between safety switches and a main clutch.

A return spring 29 is provided between the control arm 25 and shift lever 26 for biasing the distal end of the shift lever 26 in the bending direction of the bight sections W1 and W2. The neutral section includes a safety switch 62. As shown in FIG. 11, the main clutch MC is operable by a pedal 63 which also includes a safety switch 64. The two safety switches 62 and 64 are connected to an engine starting control circuit 67 to cause an engine starting cell motor 66 to operate through a key switch 65 only when the shift lever 39 is in neutral and the main clutch MC is disengaged.

What is claimed is:

1. A change speed control structure for a hydraulic transmission having change speed hydraulic actuator means, comprising:
    a rotary valve for controlling said change speed hydraulic actuator means,
    shift lever means including a shift lever body and a guide groove for guiding the shift lever body,
    said guide groove including a first straight portion, a second straight portion and a third straight portion extending parallel to one another in series and offset in a transverse direction thereof, a first bight portion interconnecting an end of the first straight portion adjacent the second straight portion and an end of the second straight portion adjacent the first straight portion, a second bight portion interconnecting an end of the second straight portion adjacent the third straight portion and an end of the third straight portion adjacent the second straight portion, and an upper end, each of the straight portion including a plurality of serially increased change speed positions, and the speed positions of said second straight portion being serially higher than the speed positions of said first straight portion and the speed positions of said third straight portion being serially higher than the speed positions of said second straight portion, and
    a relay assembly for transmitting movements of said shift lever body to said rotary valve.

2. A change speed control structure as claimed in claim 1 wherein said change speed hydraulic actuator means includes a plurality of hydraulic actuators, the number of hydraulic actuators switchable with a change speed operation from a change speed position included in one of the straight portions to a change speed position included in another straight portion being smaller than the number of hydraulic actuators switchable with a change speed operation from one change speed position to another change speed position included in the same straight portion.

3. A change speed control structure as claimed in claim 1 wherein said relay assembly includes;
    a first pulley mounted on a rotary shaft operatively connected to said shift lever body,
    a second pulley mounted on a rotary shaft operatively connected to said rotary valve and having a smaller diameter than the first pulley,
    a first transmission strip having an end wound on and secured to the first pulley and the other end wound on and secured to the second pulley for transmitting a rotation in one direction of the first pulley to the second pulley, and
    a second transmission strip having an end wound on and secured to the first pulley and the other end wound on and secured to the second pulley in opposite directional relationship with the first transmission strip for transmitting a rotation in the other direction of the first pulley to the second pulley.

4. A change speed control structure as claimed in claim 3 wherein said first and second transmission strips have said other ends partially overlapping each other in the winding directions on the second pulley.

5. A change speed control structure for a hydraulic transmission having change speed control means, comprising;
    a rotary valve for controlling said change speed hydraulic actuator means,
    shift lever means including a shift lever body and a guide groove for guiding the shift lever body, said guide groove including a plurality of straight portions extending parallel to one another in series, offset in a transverse direction thereof and connected to one another at bight portions thereof, and
    a relay assembly for transmitting movements of said shift lever body to said rotary valve, characterized in that
    a first bight portion (W1) interconnects a connecting end of the first straight portion (L1) and a connecting end of the second straight portion (L2) and a second bight portion (W2) interconnects a connecting end of the second straight portion (L2) and a connecting end of the third straight portion (L3),
    that each straight portion (L1, L2, L3) includes a plurality of change speed portions, and
    that the first straight portion (L1) includes the change speed portion for a low speed forward drive, the second straight portion (L2) includes the change speed portion for an intermediate speed forward drive, and the third straight portion (L3) includes the change speed portion for a high speed forward drive.

6. A change speed control structure as claimed in claim 5 characterized in that the change speed portions for the shift lever body (39) of the three straight portions (L1, L2, L3) are related to operational positions of a change speed control means (18V, 19V, 20V), wherein merely one of the change speed control means (18V, 19V, 20V) is switched at least in the changeover within the first and second straight portions, and the plurality of change speed control means are switched in the changeover from one of the straight portions to the other straight portion.

* * * * *